US006554572B2

United States Patent
Rinck et al.

(10) Patent No.: US 6,554,572 B2
(45) Date of Patent: Apr. 29, 2003

(54) GAS TURBINE ENGINE BLADE (75) Inventors: Gerard Anthony Rinck, Cincinnati, OH (US); Mark Edward Stegemiller, Franklin, OH (US); Hardev Singh, Mason, OH (US); Brian Alan Norton, Cincinnati, OH (US)

(73) Assignee: General Electric Company, Schnectady, NY (US)

( * ) Notice: Subject to any disclaimer, the term of this patent is extended or adjusted under 35 U.S.C. 154(b) by 55 days.

(21) Appl. No.: 09/859,610

(22) Filed: May 17, 2001

(65) Prior Publication Data

US 2002/0187039 A1 Dec. 12, 2002

(51) Int. Cl.[7] .................................................. F01D 5/18
(52) U.S. Cl. .................... 416/97 R; 415/115; 29/889.1; 29/889.721
(58) Field of Search .......................... 416/97 R, 96 R, 416/95; 415/115; 29/889.1, 889.721

(56) References Cited

U.S. PATENT DOCUMENTS

| | | | |
|---|---|---|---|
| 3,560,107 A | 2/1971 | Helms | 416/90 |
| 3,619,082 A | 11/1971 | Meginnis | 416/90 |
| 3,644,059 A | 2/1972 | Bryan | 416/97 |
| 3,864,199 A | 2/1975 | Meginnis | 161/112 |
| 3,950,114 A | 4/1976 | Helms | 416/97 |
| 5,253,976 A | 10/1993 | Cunha | 415/114 |
| 5,816,777 A * | 10/1998 | Hall | 416/97 R |
| 5,927,946 A | 7/1999 | Lee | 416/97 |
| 6,077,036 A * | 6/2000 | Heffron et al. | 415/115 |
| 6,234,754 B1 * | 5/2001 | Zelesky et al. | 415/115 |
| 6,243,948 B1 * | 6/2001 | Lee et al. | 29/889.1 |
| 6,283,708 B1 * | 9/2001 | Zelesky | 416/97 R |
| 6,287,075 B1 | 9/2001 | Kercher | 416/97 R |

* cited by examiner

Primary Examiner—Edward K. Look
Assistant Examiner—Igor Kershteyn
(74) Attorney, Agent, or Firm—William Scott Andes; Barbara Joan Haushalter (57) ABSTRACT

A turbine blade for a gas turbine engine. An existing blade was found to exhibit bowing, or a concave configuration facing the pressure side, along its trailing edge. The invention reduces bowing by (1) changing tilt, (2) changing lean, (3) reducing the number of cooling holes, while (4) changing the diameters of the cooling holes, to maintaining the total cooling flow unchanged.

15 Claims, 10 Drawing Sheets

GAS TURBINE ENGINE BLADE

TECHNICAL FIELD

The invention relates to a turbine blade having improved structural and cooling properties.

BACKGROUND OF THE INVENTION

The turbine blades in a gas turbine engine operate in a harsh environment: a high G-field applies significant stress to the blades, and the blades operate under high-temperature conditions.

The size of the G-field can be illustrated by a simple example. Centrifugal acceleration is given by the expression $$a = (w\text{-squared}) \times r,$$

wherein a is the centrifugal acceleration, w is the rotational velocity in radians per second, and r is the radius at which the acceleration is computed.

If a shaft of radius one foot rotates at 10,000 rpm, which corresponds to 167 revolutions per second, then the centrifugal acceleration a is computed as $$a = (167 \times 2 \times PI)(1/sec) \times (167 \times 2 \times PI)(1/sec) \times 1 \text{ foot,}$$

or about 1.1 million feet/second-squared. To convert this acceleration into units of G's, wherein one G is the earth's acceleration-due-to-gravity, one divides by 32.2, to obtain about 34,000 G's.

Clearly, this high G-field applies significant stress to the blade: a blade which weighs one pound under static conditions will weigh 34,000 pounds in operation. In addition, the gas loading applies additional stresses to the blades, in different directions from the G-field.

In addition to stresses due to G-fields, the temperature of the gas to which the turbine blade is subject is high. For example, turbine inlet temperatures of 2,500 F. are common. High temperatures weaken many metals. To combat the high temperature, some turbine blades are actively cooled, as by passing cooling air through passages contained in the blades.

The Inventors have developed a new structure for a turbine blade, to reduce the deleterious effects of the stresses and temperatures.

SUMMARY OF THE INVENTION

In one form of the invention, a turbine blade is equipped with a specific tilt, specific lean, and a specific set of columns of cooling holes, wherein the hole distributions in many of the columns are non-uniform. The invention reduces a specific thermal gradient and mechanical loading in the blade, thereby reducing bowing of the blade.

DETAILED DESCRIPTION OF THE INVENTION

Figure 1:
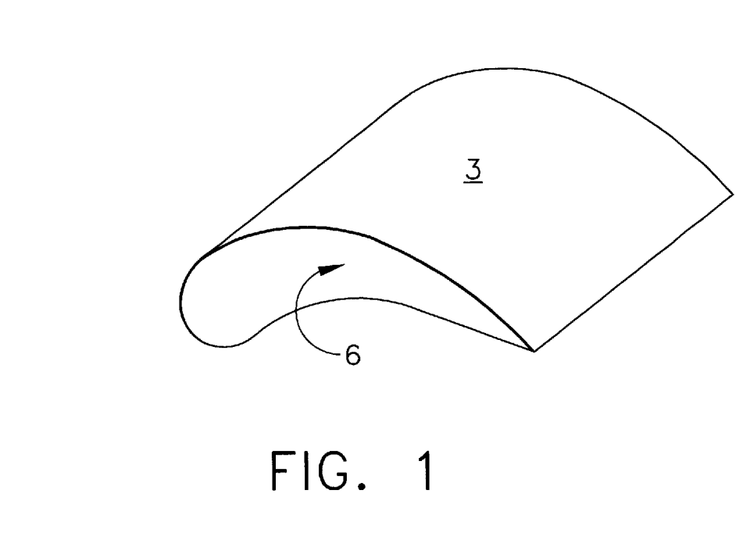
FIG. 1 illustrates a simplified airfoil section of a turbine blade.
Figure 2:
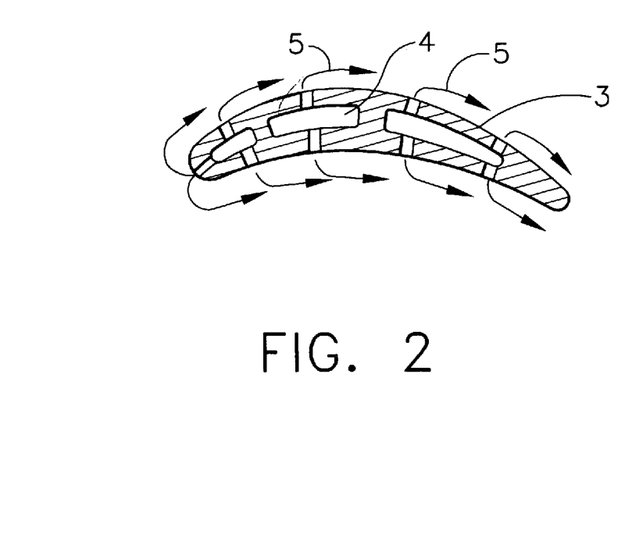
FIG. 2 illustrates cooling passages 4, and cooling holes 5, in the turbine blade 3.
Figure 3:
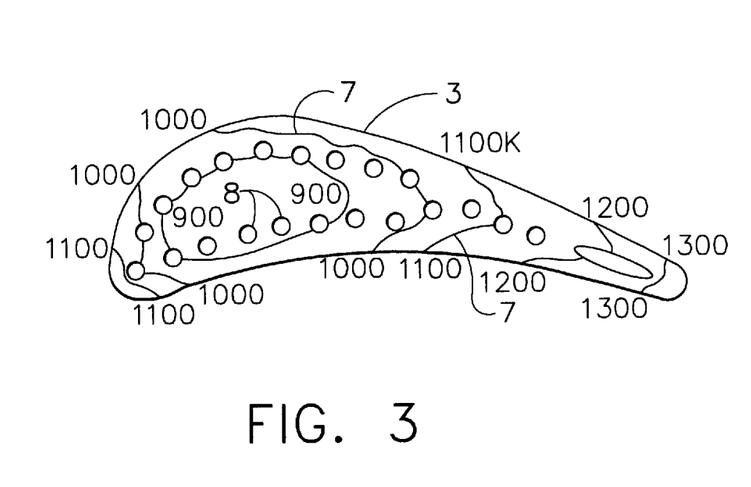
FIG. 3 illustrates generic temperature gradients found in the tip 6 in FIG. 1 of the blade 3.

FIG. 1 illustrates an airfoil section of a generic turbine blade 3 used in a gas turbine engine. FIG. 2 illustrates a cross-sectional view, and shows internal passages 4, which deliver cooling air films 5. With such cooling, the tip 6 of the blade in FIG. 1 will attain a temperature profile such as that shown in FIG. 3, which shows isotherms 7. The cooling holes 8 in the tip in FIG. 3 are not shown in FIG. 1.

Figure 4:
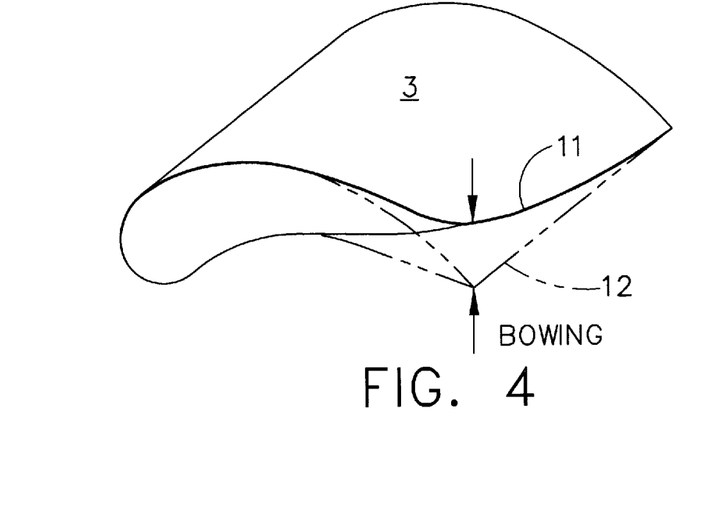
FIG. 4 illustrates a phenomenon which the Inventors have identified.

The Inventors have observed that a particular turbine blade tends to bow in operation, as indicated in FIG. 4. The bowing is indicated by the deviation of the trailing edge 11 from the normal trailing edge shape, indicated by dashed line 12. This particular blade is found in the first stage of the high-pressure turbine of the CF6-50 gas turbine engine, which is commercially available from the General Electric Company.

The Inventors suspect that a thermal gradient is partly responsible for the bowing. In order to reduce the bowing, the Inventors have examined numerous different structural configurations for this type of blade, including different patterns of cooling holes, for the blade. The examinations took the form of running computer models, and examining actual samples of blades.

The Inventors have determined that, if the blade is modified to assume (1) a tilt of 3.2 degrees, (2) a lean of 2.1 degrees, and (3) a specific pattern of cooling holes on the pressure side, then the bowing is reduced substantially. In addition, a significant reduction in one particular temperature gradient is attained.

Figure 5:
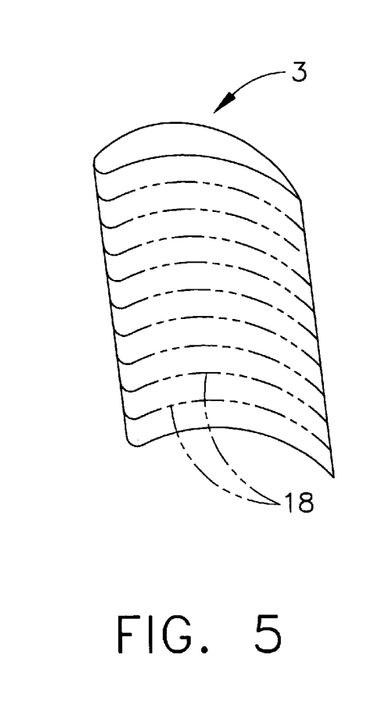
FIG. 5 illustrates a turbine blade 3, and airfoil sections 18 superimposed thereon.
Figure 6:
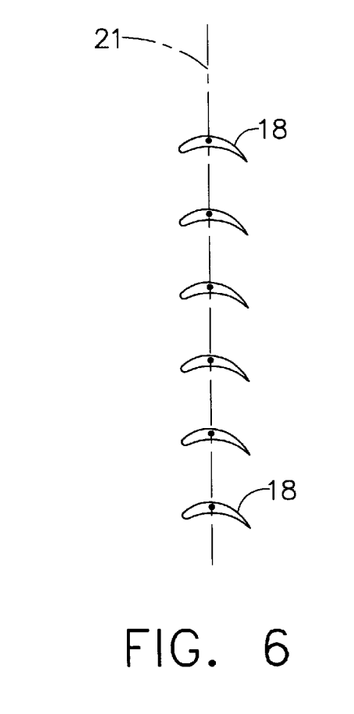
FIG. 6 illustrates an exploded view of the airfoil sections 18, arranged along a stacking axis 21.

Prior to explaining this reduction, the parameters of tilt and lean will be explained. FIG. 5 shows a generic turbine blade 3. It is designed as a stacked sequence of airfoil, or foil, sections 18. FIG. 6 shows the foil sections 18 in exploded, unstacked form. The foil sections 18 are stacked on a stacking axis 21, as known in the art. The stacking axis 21 can assume different orientations, such as tilt and lean, which will now be explained.

Figure 7:
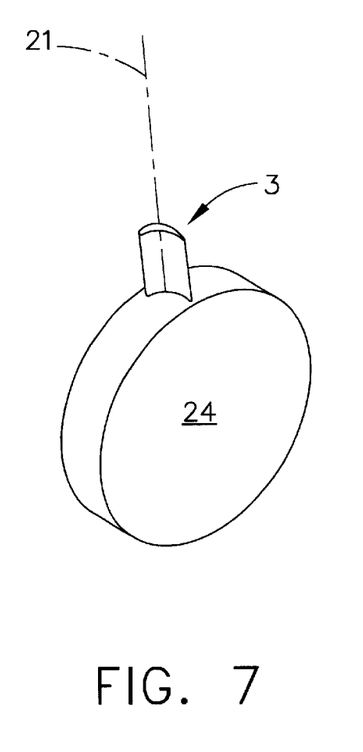
FIGS. 7, 8, 9, and 10 illustrate a coordinate system, used to define the terms tilt and lean.
Figure 8:
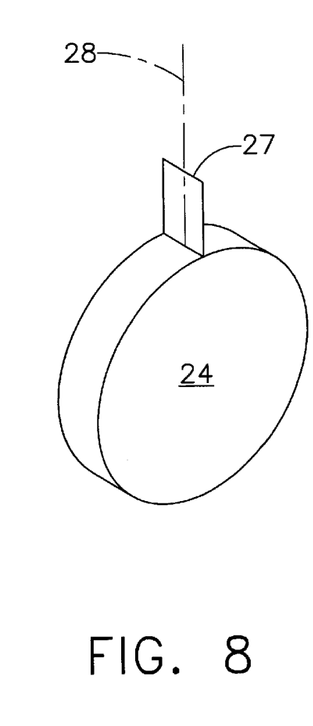

FIG. 7 is a schematic representation of a turbine blade 3 on a turbine disc 24. The stacking axis 21 is shown. FIG. 8 shows the blade in simplified form, as a flat plate 27. The flat plate 27 is shown co-planar with the geometric axial plane 30, shown in FIG. 9. Dashed line 28 is a radial line.

Figure 9:
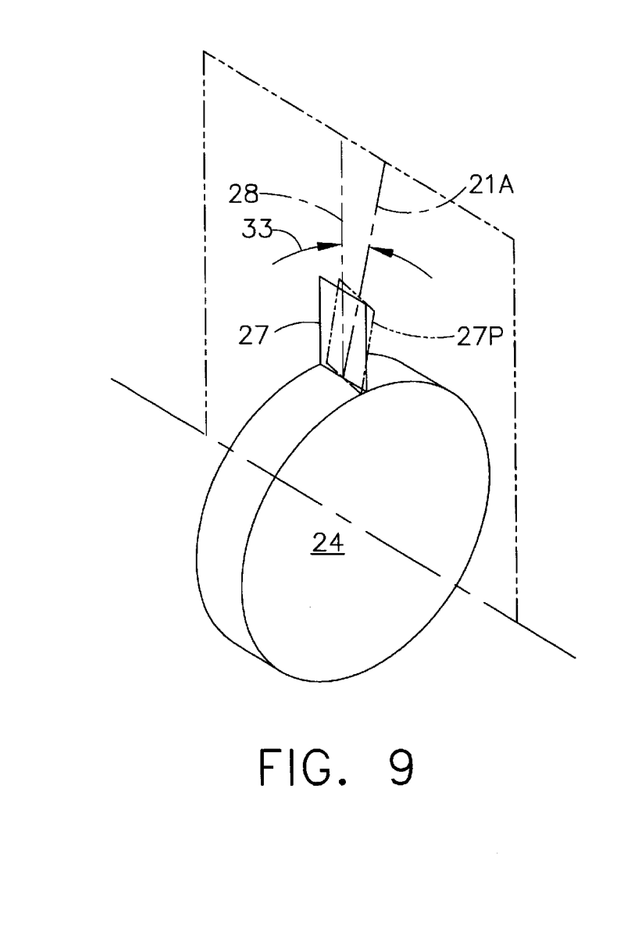

The term lean refers to leaning the body 27 of the blade away from the radius 28, as indicated by leaned stacking axis 21A. Restated, phantom blade 27P exhibits lean, compared with flat blade 27. However, with lean present, the stacking axis 21A still remains within the axial plane 30. Angle 33 represents the lean angle.

Figure 10:
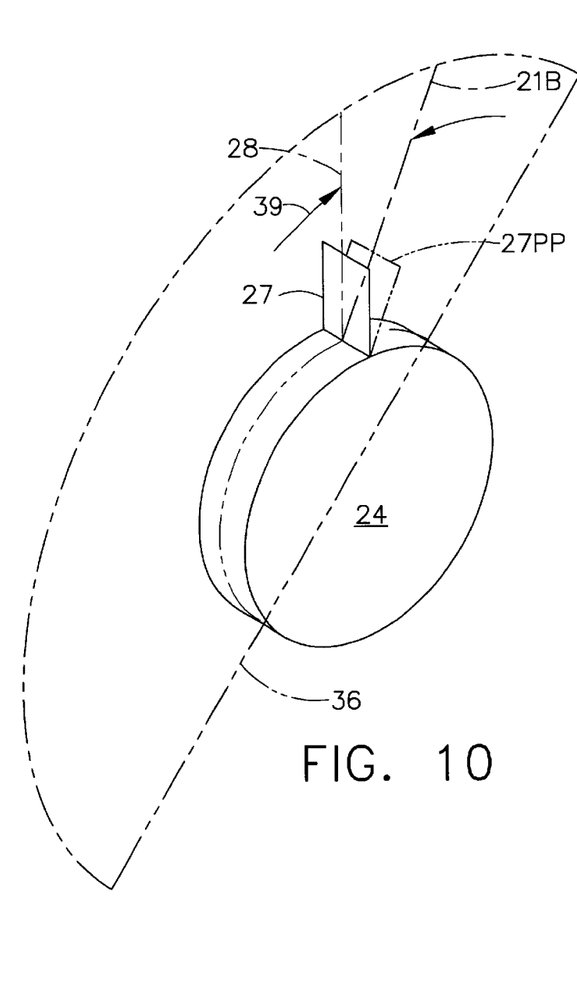

The term tilt is explained in FIG. 10. It refers to tilting the body of the blade 27 away from the axial plane 30 in FIG. 9, as indicated by tilted stacking axis 21B in FIG. 10. Restated, phantom blade 27PP exhibits tilt, compared with blade 27. The tilted stacking axis 21B is moved within a radial plane 36. Angle 39 represents the tilt angle.

Now the tilt and lean angles stated above can be illustrated by reference to FIGS. 9 and 10. Under the invention, the lean angle 33 in FIG. 9 would be 2.1 degrees, and the tilt angle 39 in FIG. 10 would be 3.2 degrees.

Figure 11:
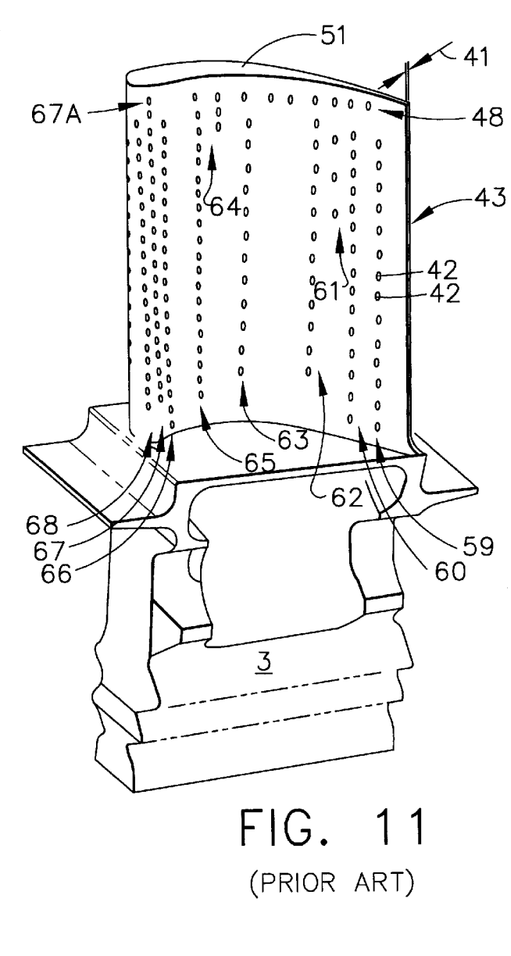
FIG. 11 illustrates a turbine blade found in the prior art.

The Inventors point out that, in the prior-art blade of FIG. 4, which exhibits the bowing phenomenon, and which is shown in greater detail in FIG. 11, tilt is 2.7 degrees, and lean is 3.5 degrees. Thus, under the invention, tilt is increased by 18.5 percent, from 2.7 to 3.2 degrees, while lean is decreased by 40 percent, from 3.5 to 2.1 degrees.

Figure 12:
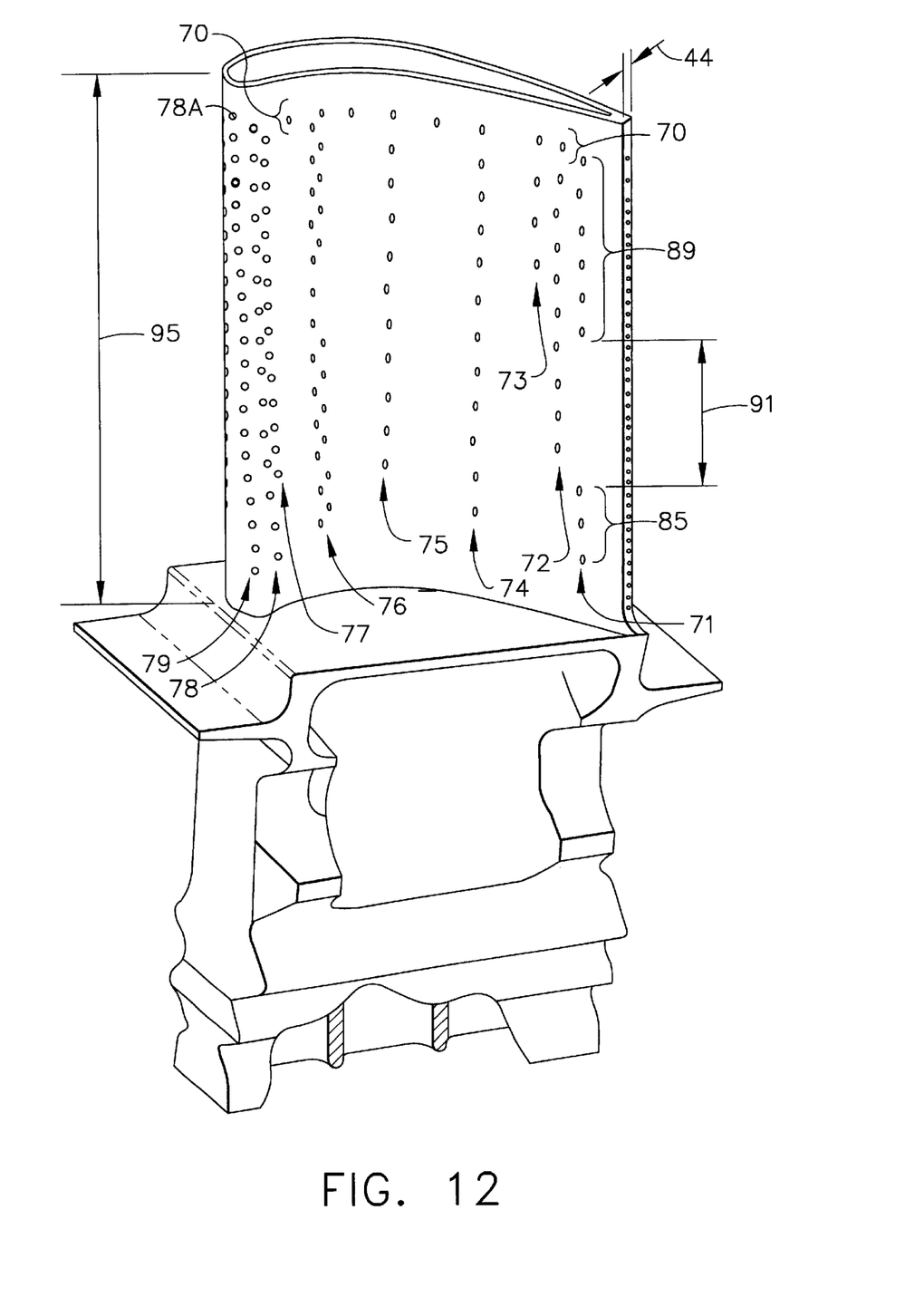
FIG. 12 illustrates one form of the invention.

As stated above, the invention also includes a specific pattern of cooling holes. FIG. 11 illustrates a first-stage high-pressure turbine blade 3, as in the prior art, which encountered the bowing problem described above. Cooling holes 42 are shown. FIG. 12 illustrates a cooling hole pattern according to one form of the invention.

The Inventors have found that, for the blade which exhibits bowing, the temperature differential 41 of FIG. 11 is a specific temperature difference, which will be called T herein. This differential is between the pressure side and the suction side, at the trailing edge, measured at mid-span, that is, near region 43.

The corresponding differential 44 in FIG. 12, under the invention, is found to be lower, at 68 percent of T. This reduction in temperature differential, together with the change in tilt and lean, reduces the bowing described above.

A detailed discussion of some characterizations of the hole patterns of FIGS. 11 and 12 will be given. The hole patterns can be divided into groups: (1) a single row and (2) multiple columns. The prior art blade 3 of FIG. 11 contains (1) a row 48 of ten holes at the blade tip 51 and (2) ten columns of holes, labeled 59–68.

The invention-blade of FIG. 12 contains (1) a row 70 of eight holes at the tip, as opposed to ten holes in FIG. 11, and (2) nine columns 71–79 of holes, rather than ten columns, as in FIG. 11.

Hole 78A in FIG. 12 is considered a member of column 79. Hole 67A in FIG. 11 is considered a member of column 67.

The populations of these row and columns are indicated by Tables 1 and 2, below.

TABLE 1

PRIOR ART BLADE (FIG. 11)

| COLUMN | NUMBER OF HOLES |
|---|---|
| 59 | 14 |
| 60 | 15 |

TABLE 1-continued

PRIOR ART BLADE (FIG. 11)

| COLUMN | NUMBER OF HOLES |
|---|---|
| 61 | 3 |
| 62 | 12 |
| 63 | 12 |
| 64 | 2 |
| 65 | 19 |
| 66 | 20 |
| 67 | 20 |
| 68 | 19 |

TABLE 2

INVENTION (FIG. 12)

| COLUMN | NUMBER OF HOLES |
|---|---|
| 71 | 9 |
| 72 | 9 |
| 73 | 3 |
| 74 | 11 |
| 75 | 10 |
| 76 | 25 |
| 77 | 15 |
| 78 | 15 |
| 79 | 21 |

Under the invention of FIG. 12, the diameters of the holes are given in Table 3. All holes in a given column are of the same diameter, with the exception of column 71, which contains two groups of holes. The holes in each group are the same diameter. The holes in row 70 are all of the same diameter, which is 0.012 inches.

TABLE 3

INVENTION (FIG. 12)

| COLUMN | HOLE DIAMETER |
|---|---|
| 71 | lower 3 holes - 16 mils |
| 71 | upper 6 holes - 17 mils |
| 72 | 17 mils |
| 73 | 17 |
| 74 | 15 |
| 75 | 15 |
| 76 | 15 |
| 77 | 15 |
| 78 | 15 |
| 79 | 13 |

Several similarities and differences between these hole patterns are the following.

One, the row 48 in FIG. 11 contains ten holes. Row 70 in FIG. 12 contains 8 holes. One definition of row is a discrete chain of holes at the topmost position, that is, nearest the blade tip, on the pressure side of the blade, excluding any holes such as 78A which are member of the leading edge columns 77–79.

Two, the column 64 of two holes in FIG. 11 has been deleted in FIG. 12.

There, the column 65 in FIG. 11 has been replaced by a column 76 of twenty-five staggered holes. The stagger was imposed to attain a sufficiently large total area of holes, to attain a large airflow, while retaining high structural strength. That is, if the holes were placed in a single column, the distance separating adjacent holes would be small, and thus the material spanning that distance would be weak.

Figure 14:
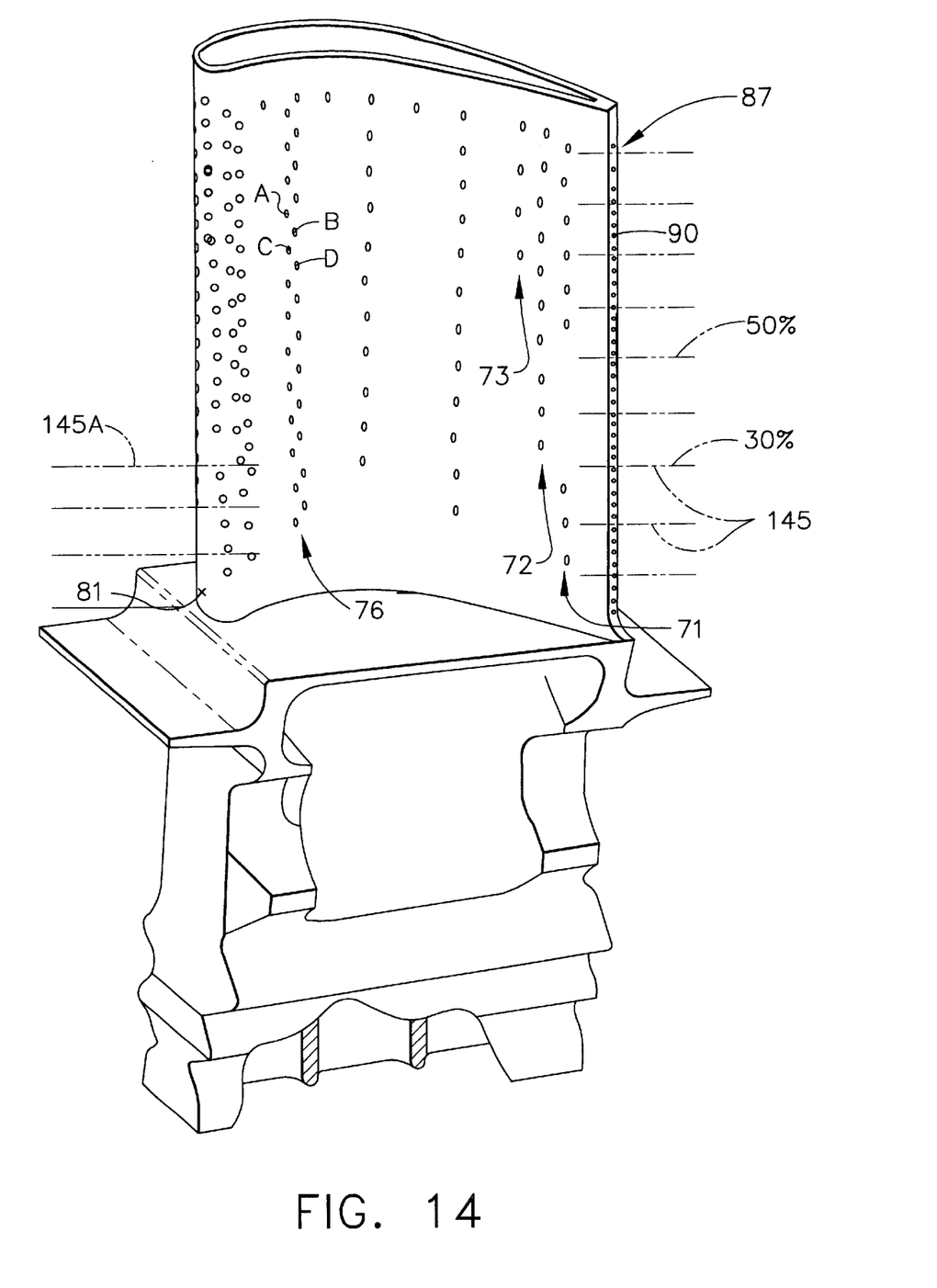
FIG. 14 illustrates the invention-blade of FIG. 12, with reference stations 145 superimposed thereon.

As a specific example of relative distances, holes A, B, C, and D are labeled in FIG. 14. Vertical distances AB, BC, and CD are substantially equal, within 5 percent. The term AB refers to the distance between holes (A, B), and this convention applies to other pairs, such as BC and AC. Stagger distances AC and BD are substantially equal, within 5 percent. These relationships of vertical distance and stagger distance apply to all holes in column 76.

From another perspective, column 76 is divided into two sub-columns, spaced 20 mils, or 0.020 inch, apart, with the horizontal distance, or projection, between A and B representing the spacing.

Four, the holes in trailing column 59 in FIG. 11 are uniformly spaced. That is, the distances between neighboring holes are identical. Trailing column 59 is that closest to the trailing edge. However, in FIG. 12, the holes in trailing column 71 are not uniformly spaced. They are arranged in two groups 85 and 89.

The distance 91 between group 85 and 89 is greater than the spacing between neighboring holes in either group 85 or 89. That is, distance 91 is greater than the hole-to-hole spacing in group 89, and is greater than the hole-to-hole spacing in group 85.

Figure 13:
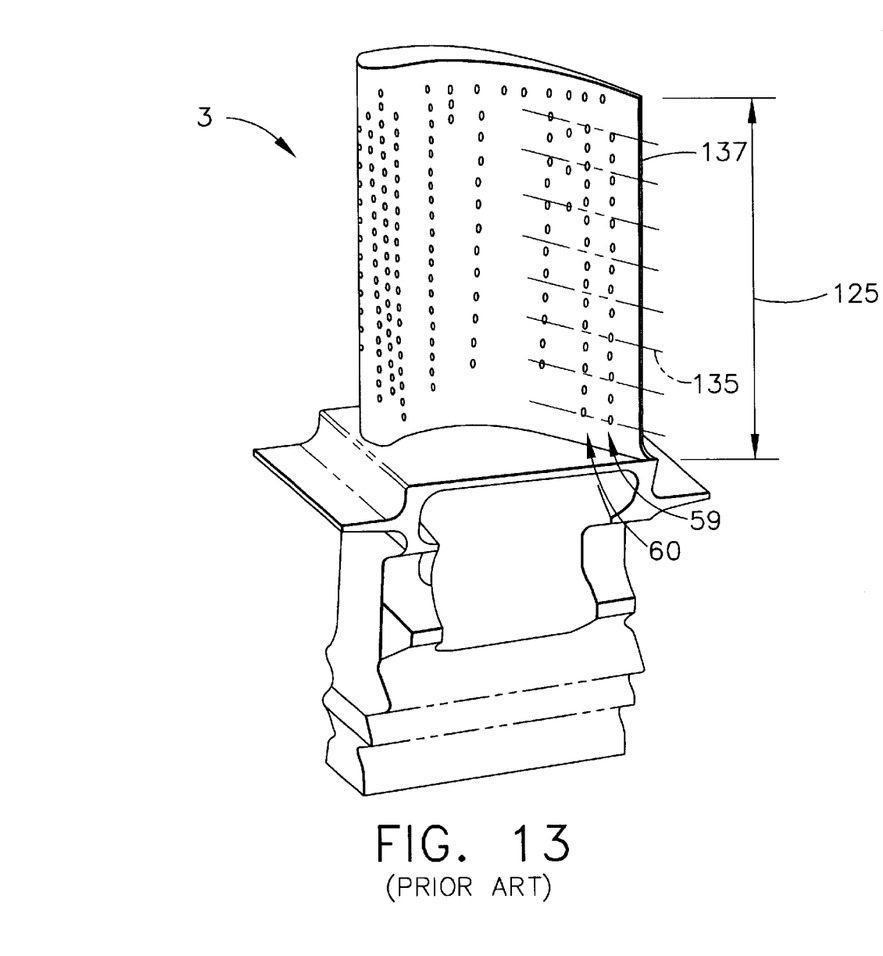
FIG. 13 illustrates the prior-art blade of FIG. 11, with reference stations 135 superimposed thereon.

Five, FIG. 13 repeats the blade 3 of FIG. 11, and shows parallel lines, which divide the height 125 of the trailing edge 137 into ten equal parts, or stations. Each station represents ten percent of the blade height 125. In the prior art blade 3, cooling holes in both the aft-most two columns 59 and 60 are present below the 20-percent station, labeled 135.

Under the invention-blade of FIG. 14, no holes are present in the columns 72, below the 30-percent station 145, labeled 30%. Further, no holes are present in the last column 71 between the 30 percent station and the 50 percent station.

The Inventors point out that the blade of FIG. 14 is drawn to actual scale. In the actual blade, overall height, from the very bottom of the root to the tip, is 4.2 inches.

Six, the total number of holes in columns 59–68 in FIG. 11 is 136. The total number of holes in columns 71–79 in FIG. 12 is 116, or a reduction to 85 percent of the previous number. Equivalently, the reduction is by 15 percent.

While the holes in question are distributed among different numbers of columns (10 columns 59–68 in FIG. 11 and 9 columns 71–79 in FIG. 12), both these sets of columns are located aft of corresponding reference points, such as point marked X in FIG. 14, and labeled 81. To locate point 81, for example, on the blades of FIGS. 11 and 12, one would find the point on one blade which is forward of all columns, and then locate the corresponding point on the other blade by measurement.

Last column 71 in FIG. 14 should not be confused with the column of holes 87 in the trailing edge.

Some of the columns 71–79 in FIG. 12 are supplied by a separate internal passage (not shown), of the type shown in FIG. 2, although the internal passages in FIG. 12 can be connected to each other by manifolds. Thus, holes in a column such as column 75 in FIG. 12 need not be exactly aligned in a straight line, and, in blades having twist, probably will not be.

Therefore, the configuration shown in FIG. 12, together with the stated twist and lean, reduce the temperature differential 44 to 68 percent of the parameter T identified above, when measured in degrees F, as opposed to absolute temperature. Stated another way, temperature T is reduced by 32 percent. This reduction, and the structural modifications described above, reduce the bowing illustrated in FIG. 4.

Figure 15:
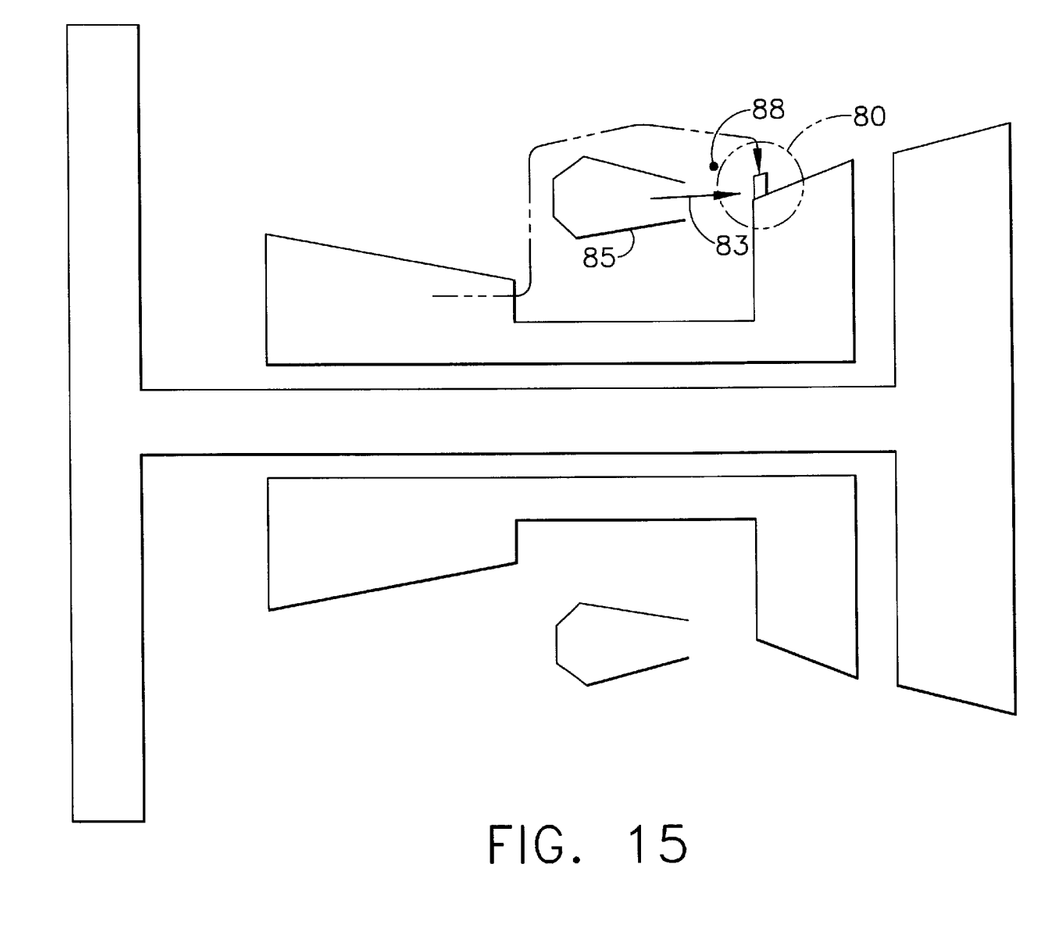
FIG. 15 illustrates a simplified schematic of a gas turbine engine.

In another form of the invention, existing turbine blades on an existing gas turbine engine are replaced with blades modified according to the invention. Total cooling flow through the replacement blades remains the same as in the replaced blades. Cooling flow is measured either in pounds of air per second, or percentage of compressor flow. FIG. 15 illustrates one context in which this replacement occurs.

The turbine blades in question are located in dashed circle 80. Hot gases 83 from combustor 85 are ducted onto these turbine blades. The turbine inlet temperature, at point 88, lies in the range of 2,500 degrees F. As stated above, under these conditions, the temperature differential 44 in FIG. 12 is reduced to 68 percent of the corresponding differential in FIG. 11. This differential is measured under full power, hot day conditions.

A generalized procedure for attaining a similar differential, for a generalized blade, will now be given.

Figure 16:
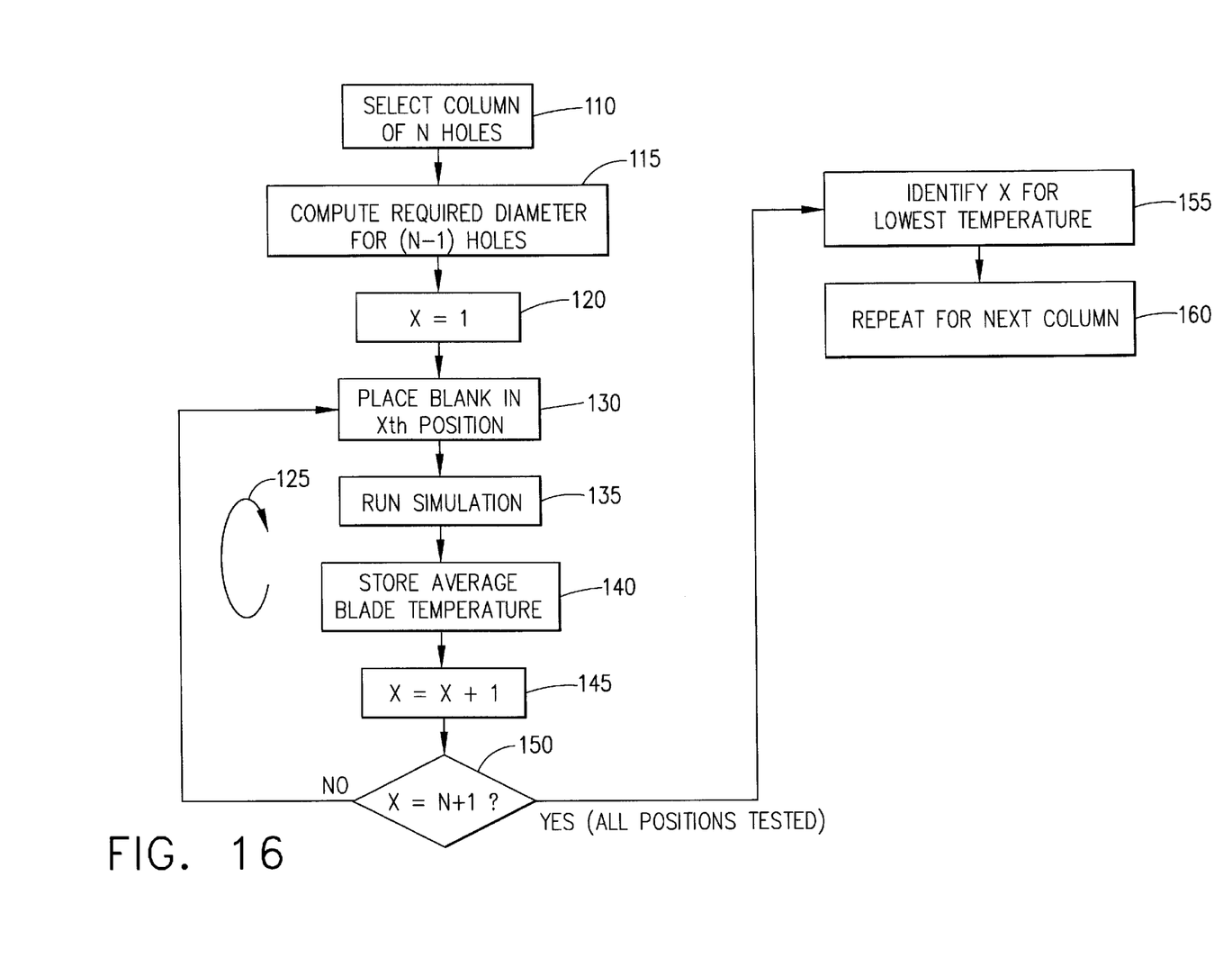
FIG. 16 is a flow chart of processes undertaken by one form of the invention.

FIG. 16 illustrate a flow chart. One overall goal is to first eliminate one cooling hole in, for example, the column 101 of ten holes in FIG. 17, thereby leaving nine holes. Next, the diameters of the nine holes is computed which will give the equivalent flow as in column 101. Then, the nine holes are distributed over the ten positions of column 101, as in FIG. 19. A parameter of interest is computed for each distribution in FIG. 19, such as average blade temperature. After all ten distributions have been computed, the distribution providing the best value of the parameter is selected. The process is repeated for the other columns in FIG. 17.

Figure 17:
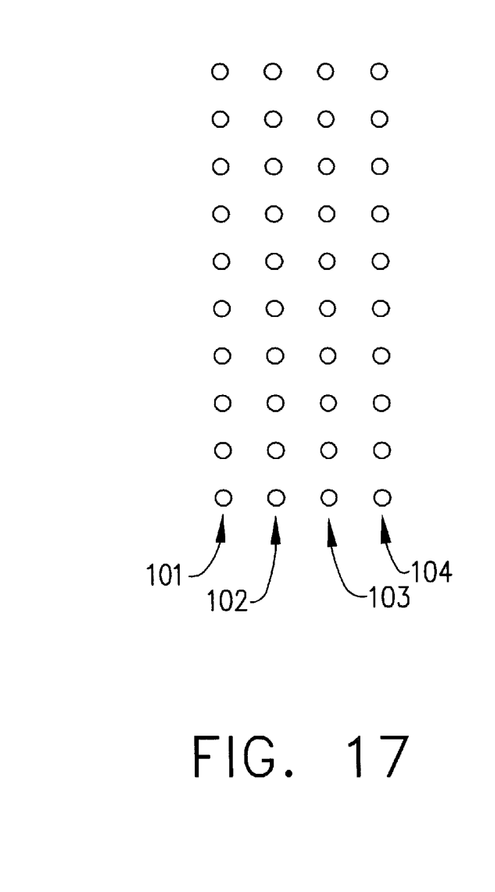
FIG. 17 illustrates a generic pattern of cooling holes, used in a turbine blade (not shown).

Explaining this in greater detail, it is first assumed, for simplicity, that the blade in question contains four columns 101–104 of holes, as shown in FIG. 17. This number four is not critical, because the procedure outlined applies to any number of columns.

In block 110 of FIG. 16, one column is selected, such as column 101. The column contains ten holes, with 10 corresponding to N in block 110.

In block 115 in FIG. 16, the required diameter needed for (N-1) holes to deliver the same airflow as N holes is computed. That is, one hole is eliminated, and then the diameter of the remaining holes, of equal diameter, is computed which will give the same airflow.

Block 120 indicates the beginning of a loop 125 in which a parameter of interest, such as average blade temperature, is computed for different configurations of the nine holes in question. A configuration of the nine holes is selected, and then temperature is computed.

Figure 18:
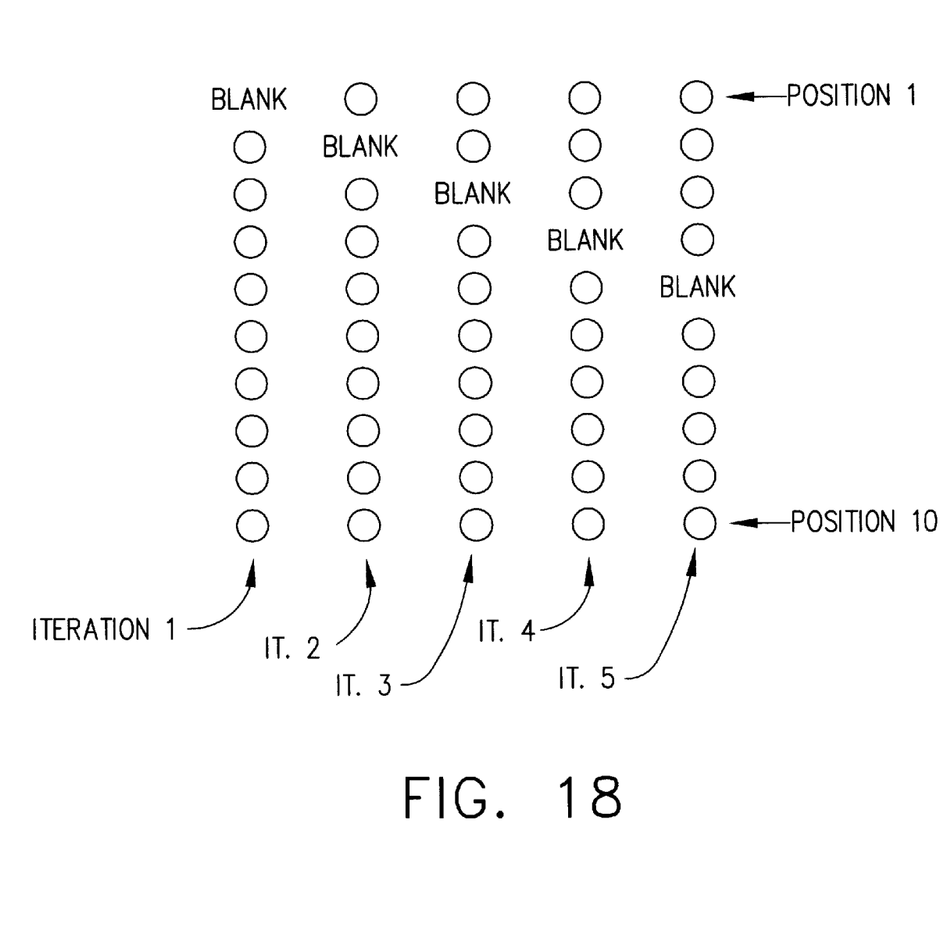
FIG. 18 illustrates how a column 101 of holes in FIG. 17 can be successively modified under the invention, in pursuit of an improved hole pattern.

In block 120, a dummy variable X is set to unity. In block 130, a blank, or absence of a hole, is set to the Xth position. FIG. 18 illustrates the blank: with dummy variable X set to 1, iteration 1 is occurring, and the blank in FIG. 18 is set to position number 1, as indicated in the column for iteration 1.

Block 135 in FIG. 16 indicates that a computer simulation is run. Block 140 indicates that a parameter of interest, computed in the simulation, is stored for that simulation. Average blade temperature is indicated as that parameter. However, the temperature differential 44 of FIG. 12 can be selected as the parameter of interest, as can other temperatures of the blade, or other combinations of parameters.

Thus, at this time, a computation has been made for temperature, with (1) column 101 in FIG. 17 being replaced by the column labeled iteration 1 in FIG. 18 and (2) columns 102, 103, and 104 in FIG. 17 being unchanged.

In block 145, the dummy variable X is incremented. In decision block 150, inquiry is made as to whether X equals (N+1). If not, indicating that a blank has not been placed at all hole positions, the NO branch is taken, and the process returns to block 130.

Figure 19:
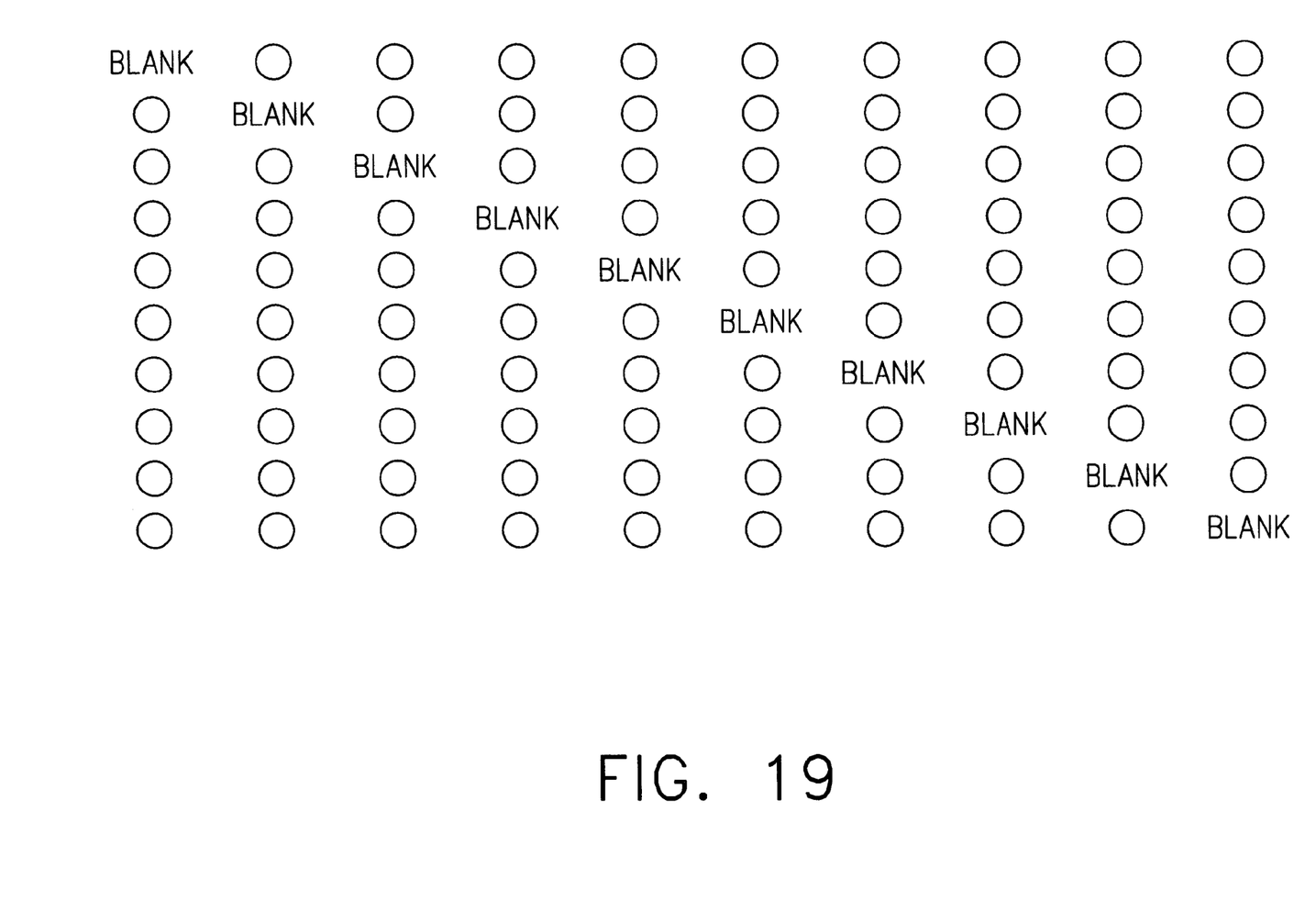
FIG. 19 illustrates a sequence of configurations, wherein the ten holes in, for example, column 101 in FIG. 17 is reduced to nine holes, and those nine holes are distributed in a column of ten possible positions, in ten different ways.

Repeated excursions along the NO branch, to thereby repeatedly cause executions of loop 125, cause successive simulations to be undertaken, with the blank, or absent hole, to be successively positioned as indicated in FIG. 19.

If, in decision block in FIG. 16, it is determined that X does equal (N+1), that fact indicates that a blank has been placed at all hole positions. The YES branch is taken, and the logic reaches block.

In that block, the iteration providing the lowest value of the parameter of interest is identified. Thus, the position of the hole providing the lowest value of the parameter of interest is identified.

Block 160 in FIG. 16 indicates that the process is repeated. The process can be repeated for all columns of holes in FIG. 17. Numerous options arise at this point. For example, the preceding process can be repeated for each column 102, 103, and 104 in FIG. 17. In each repetition, the other columns are left in their original state, containing ten holes. Then, when the optimal configuration in each column is found, those four optimals are combined into four new columns, of nine holes each.

As another example, when an optimal configuration is found for a column, that column can be replaced by the optimal, and the replaced column is used in the computations for finding the optimals in other columns.

In addition, elimination of a single hole in each computation was discussed above. In another approach, two, or more, holes can be eliminated, and the remaining holes distributed over the original positions.

In the general case, a matrix of all possible positions for holes is generated. Different combinations of column-configurations are tested, and the optimal configuration is selected.

In one mode of operation, the overall hole pattern, or that of an individual column, in FIG. 12 is selected. That is, the pattern used by the invention is selected as a starting point. Then modifications of that pattern are made, and the temperature behavior is examined.

The temperatures described herein are measured under conditions of full power applied on a hot day, as those terms are defined in the gas turbine aircraft industry.

One result provided by the invention is that the trailing edge 90 in FIG. 14 is constrained to lie along a radial line of the engine, both during operation, and in static, non-operational conditions.

Numerous substitutions and modifications can be undertaken without departing from the true spirit and scope of the invention. What is desired to be secured by Letters Patent is the invention as defined in the following claims.

What is claimed is:

1. A method of modifying a turbine blade in a gas turbine engine, comprising:
    a) increasing tilt by 18.5 percent;
    b) decreasing lean by 40 percent; and
    c) reducing number of cooling holes, while increasing diameter of at least some holes, to maintain cooling airflow unchanged.

2. The method according to claim 1, further comprising the step of reducing temperature differential across the trailing edge to 68 percent of its previous value, under hot-day, full-power conditions.

3. The method according to claim 1, further comprising the step of reducing to 15 percent.

4. A system, comprising:
    a) a gas turbine engine, which includes a first stage high-pressure turbine, in which turbine blades experience a temperature differential of T degrees F across their trailing edges; and
    b) means for reducing the differential to 68 percent of T.

5. The system according to claim 4, wherein the gas turbine engine is of the CFE-50 type.

6. The system according to claim 4, wherein the means includes a tilt in the turbine blades of 3.2 degrees.

7. The system according to claim 4, wherein the means includes a lean of 2.1 degrees.

8. A method for reducing bow in a film-cooled turbine blade, which includes, on its pressure side, an arrangement of cooling holes which are defined into (A) a single row of tip cooling holes and (B) nine columns of holes, numbered beginning with a first column at a trailing edge, comprising the steps of:
    providing in a first column (71): 9 holes total, 3 holes of diameter 16 mils and 6 holes of diameter 17 mils;
    providing in a second column (72): 9 holes, of diameter 17 mils;
    providing in a third column (73): 3 holes, of diameter 17 mils;
    providing in a fourth column (74): 11 holes, of diameter 15 mils;
    providing in a fifth column (75): 10 holes, of diameter 15 mils;
    providing in a sixth column (76): 25 holes, staggered, of diameter 15 mils;
    providing in a seventh column (77): 15 holes, of diameter 15 mils;
    providing in a eighth column (78): 15 holes, of diameter 15 mils; and
    providing in a ninth column (79): 21 holes, of diameter 13 mils.

9. The method according to claim 8, wherein the step of providing 25 holes, staggered, further comprises the step of arranging the 25 holes into two parallel columns.

10. The method according to claim 9, further comprising the step of providing vertical distances (AC, BD) between vertically adjacent holes, wherein the vertical distances in a column are equal.

11. The method according to claim 9, further comprising the step of providing stagger distances (AB, BC, CD) between holes, wherein the stagger distances are equal.

12. A method of modifying a turbine blade containing a row of holes near its tip and ten columns of holes, numbered from a trailing edge, comprising:
    d) eliminating a sixth column;
    e) replacing remaining columns with columns containing holes as follows:
        i) replacing a first column by a column of 9 holes containing
            A) 3 holes of 16 mil diameter, and
            B) 6 holes of 17 mil diameter;
        ii) replacing a second column by a column of 9 holes of 17 mils diameter;
        iii) replacing a third column by a column of 3 holes of 17 mils diameter;
        iv) replacing a fourth column by a column of 11 holes of 15 mils diameter;
        v) replacing a fifth column by a column of 10 holes of 15 mils diameter;
        vi) replacing a seventh column by a pair of columns containing 25 holes of 15 mils diameter;

vii) replacing an eighth column by a column of 15 holes of 15 mils diameter;
viii) replacing a ninth column by a column of 15 holes of 15 mils diameter;
ix) replacing a tenth column by a column of 21 holes of 13 mils diameter;

f) replacing the row of holes with a row of 8 holes of 12 mils diameter.

13. The method according to claim 12, and further comprising the step of changing blade tilt to 3.2 degrees.

14. The method according to claim 12, and further comprising the step of changing blade lean to 2.1 degrees.

15. A blade for a first stage of a high-pressure turbine in a gas-turbine engine, comprising:
a) a pressure side having
   i) a row of 8 cooling holes near its tip, each hole of 12 mils diameter;
   ii) nine columns of holes, as follows:
      A) a first column (71) containing 9 holes total, 3 of diameter 16 mils and 6 of diameter 17 mils;
      B) a second column (72) containing 9 holes of diameter 17 mils;
      C) a third column (73) containing 3 holes of diameter 17 mils;
      D) a fourth column (74) containing 11 holes of diameter 15 mils;
      E) a fifth column (75) containing 10 holes of diameter 15 mils;
      F) a sixth column (76) containing 25 holes, in two sub-columns, of diameter 15 mils;
      G) a seventh column (77) containing 15 holes of diameter 15 mils;
      H) an eighth column (78) containing 15 holes of diameter 15 mils; and
      I) a ninth column (79) containing 21 holes of diameter 13 mils;
b) a lean of 2.1 degrees; and
c) a tilt of 3.2 degrees.

* * * * *